April 6, 1943.                H. C. BLODGETT                2,315,582
                                MOTOR CONTROL
                             Filed Sept. 30, 1940

INVENTOR.
Herbert Cady Blodgett
BY Earl & Chappell
ATTORNEYS

UNITED STATES PATENT OFFICE 2,315,582

MOTOR CONTROL

Herbert Cady Blodgett, Hartford City, Ind., assignor to Overhead Door Corporation, Hartford City, Ind.

Application September 30, 1940, Serial No. 359,050

15 Claims. (Cl. 175—375)

This invention relates to improvements in motor controls.

The main objects of my invention are:

First, to provide an improved reversing motor control characterized by a delayed action adapting the same for the control of a single-phase reversible motor.

Second, to provide a control device of the type described enabling the use of a number of single push buttons to obtain the desired reversing action and thereby lower the cost of installation.

Third, to provide a delay motor switch permitting the use of a single-phase motor and obtaining the same positively reversing as is accomplished by the use of a three-phase motor.

Fourth, to provide a device of the type described which obviates the use of expensive and complicated cross line switches.

Fifth, to provide an automatic reversing control for a motor actuated device such, for example, as a vertically sliding door, whereby the travel thereof in one direction or the other may be interrupted and reversed at any desired point in the travel.

Further objects relating to details and economies of my invention will appear from the description to follow. The invention is defined in the claims.

A structure embodying the features of my invention is illustrated in the accompanying drawing, wherein.

The present invention relates generally to a delayed action reversing control for a reversible single-phase motor, preferably of the three-lead induction-repulsion, compensator or capacitor type. Such single-phase motors require a drop in R. P. M. speed to permit the directional windings to be connected by means of the throw-out switch and the improved reversing control of the present invention provides such a delay whereby positive reversing of the motor will take place. The invention is particularly desirable for embodiment with motors designed for the operation of vertically acting doors or similar installations or installations in locations where three-phase current is not common or available and consequently where a single-phase motor must be utilized, and I have found that the control device of my invention, when associated with a single-phase motor of the types mentioned above and more particularly in a capacitor motor, has all the effective braking action and positive reversing characterizing a three-phase motor.

The present control also has substantial practical value, in that it eliminates the need for expensive and complicated cross line magnetic switches. Such switches have previously been employed and include "up" and "down" buttons for connecting the directional leads of the motor, the release of the switch being accomplished by a limit switch associated with the motor. The present device serves effectively as a directional device eliminating the need for such cross line switches and functioning to disconnect or stop the motor at any desired points. Thus, in the case of a motor connected to a vertically operating door, the latter may be stopped at full open or closed positions by a limit switch and, moreover, one or more circuit controlling buttons may be manipulated to interrupt and reverse at any point the movement of the door in either direction of its travel.

Figure 1:
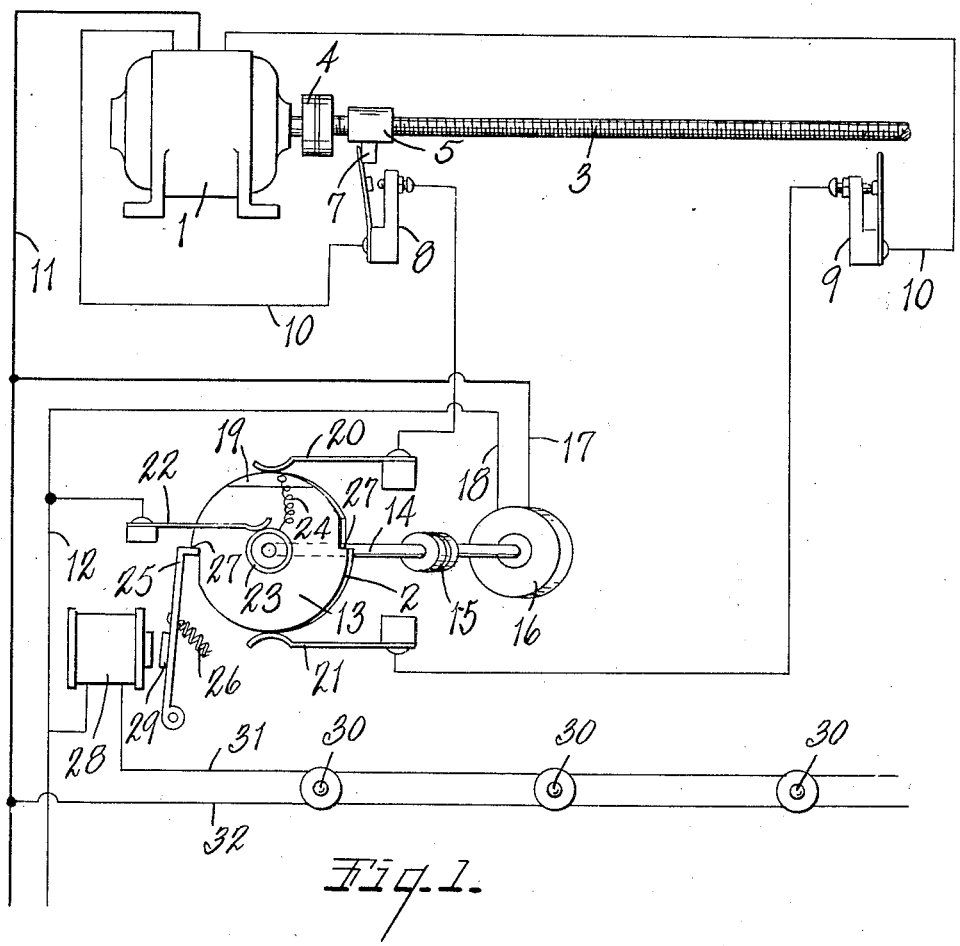
Fig. 1 is a diagrammatic view illustrating the motor delay switch of my invention operatively associated with a reversible motor and device controlled thereby, and indicating the wiring connections therefor.

Referring to Fig. 1, I illustrate and indicate by the reference numeral 1 a single-phase, three-lead reversible motor which may be employed in the operation of any desired reversing mechanism, such as a vertically operating door (not shown). This motor is characterized by the very definite and positive braking effect exercised thereby in the event it is turned higher than its synchronous speed or when it is not connected to the line. However, in the reversing of this motor, a slight delay period is necessary to enable the directional windings to be connected by means of a throw-out switch and it is for the purpose of providing such a delay period, as well as for other desired ends, that the reversing control device, generally designated by the reference numeral 2, is employed.

Motor 1 is normally employed to drive a vertically acting door or other structure, utilizing a friction clutch so that in the event the operation of the door is obstructed for one reason or another the motor can continue to rotate. In actual practice, the control of my invention, including the limit switch arrangement to be hereinafter described, is driven by a chain and sprocket arrangement from the aforesaid motor and clutch driven door actuating device so that the same operates in time with the operation of the door regardless of the position thereof. However, in corporated therein as being driven directly by motor 1 through a friction clutch, inasmuch as this constitutes the functional equivalent of the actual installation so far as the control of my invention is concerned. The description to follow should be read with this deviation from the actual practical installation in mind.

Referring to Fig. 1, it will be noted that the motor 1 has a threaded rod or shaft 3 connected to the shaft thereof by means of a friction clutch 4 and threadedly engaged with this shaft is a nut 5. It will be understood that as threaded shaft 3 rotates, the nut-like traversing member 5 will travel in one direction or another thereon depending upon the direction of rotation. Member 5 has a tappet 7 thereon controlling the making and breaking of limit switches 8, 9 at opposite extremities of the travel of the member in well known fashion and the limit switches are connected by wires 10 to the two-directional leads of the motor 1, the "hot" lead being indicated by the reference numeral 11 and being, along with the further circuit lead 12, connected to the usual 110-volt household source.

The control 2 for effecting the reversal of current in leads 10 and thereby changing the direction of rotation of motor 1 with a slight delay intervening consists of a rotor 13 of non-conducting material driven through a shaft 14 and suitable friction clutch 15 by means of a suitable motor 16. Alternatively, any suitable motor enabling intermittent "stalling" of the same for the purposes to be described may be used, such as a Telechron clock movement, in which case the last named clutch can be omitted. This motor is energized by leads 17, 18 connected to the main leads 11, 12 respectively.

Rotor 13 is provided with a block-like segment 19 of conducting material adapted to be engaged by conducting spring arms 20, 21 disposed at opposite sides of the rotor and 180° from one another in the rotor's circumferential travel. The spring arms 20, 21, which constantly engage the rotor, are connected respectively to the limit switches 8, 9. The segment is energized by a further conducting spring arm 22 electrically connected to lead 12 and slidingly engaging with a conducting ring 23 on the rotor, which latter is in turn connected to the conducting block 19 by means of a wire 24.

From the foregoing, it will be appreciated that with one of the spring arms 20, 21 in engagement with conducting block 19, current will be supplied to motor 1 through the appropriate limit switch, assuming the same is closed, but will be interrupted either at the limit switch when the latter is open or at one of the spring arms 20, 21 when the latter is out of engagement with segment 19.

The motor 16 may be assumed to operate normally at 60 R. P. M. and, when the rotor is free for rotation, to rotate the same at that speed through the friction clutch. The movement of rotor 13 is normally prevented by means of a pivoted detent 25 urged by a spring 26 in clockwise direction to engage one of two shoulders 27 provided on the rotor and released therefrom by means of an electromagnet 28, the armature 29 of which is carried by the detent. Energization of this electromagnet is controlled by instantaneously acting push buttons 30 of which there may be one or several and which act to complete a momentary circuit across the leads 32 con- It will be appreciated that when one of the push buttons 30 is instantaneously actuated and released electromagnet 28 will be energized to attract the detent 25 and release rotor 13 for rotation by the motor 16. This rotation occurs for one-half revolution, i. e., a time interval of one-half second in the case of a motor rotating at 60 R. P. M., during which conducting segment 19 is disengaged from one of the conducting fingers 20 and 21 and engaged with the other. Rotation of the rotor is terminated by engagement of detent 25 with the succeeding shoulder 27 on the rotor. When either of the fingers 20, 21 is in engagement with the conducting segment 19, one or the other of the directional windings of the motor 1 is energized through a limit switch to actuate the motor. This actuation continues if not otherwise interrupted until the nut 25 driven by the motor engages the appropriate limit switch. At this time, the motor circuit is interrupted and is not completed again until one of the push buttons 30 is actuated. However, the operation of the door may be interrupted and reversed at any point in its travel by merely actuating one of said buttons. This is accomplished without the use of expensive cross line switches and, moreover, in reversing there is the necessary delay (one-half second in the case described) required in the operation of the single-phase reversing motor. The motor 1 which I have illustrated is a capacitor type characterized by a very effective braking action whether it exceeds its synchronous speed or is disconnected from the line.

Figure 2:
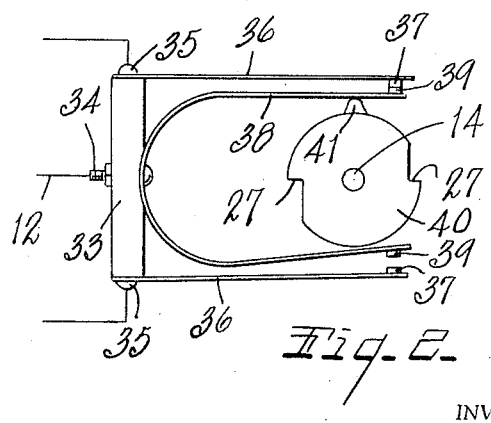
Fig. 2 is a fragmentary diagrammatic view illustrating an alternative embodiment of a timing or delay control mechanism suitable for use in the apparatus of my invention.

An alternative form of delay device suitable for use in substitution for the rotor 13 and brushes 20, 21 of Fig. 1 is illustrated in Fig. 2. This consists of an insulating block 33 having a center terminal 34 to which the conductor 12 is connected and further terminals 35 to which the conductors to the limit switches 8, 9 are connected. Each of the latter has connected thereto a resilient conducting arm 36 provided with a contact 37. Terminal 34 has secured in electrically conducting engagement therewith a U-shaped bronze spring member 38 having opposed contacts 39 on the ends of the legs thereof engageable respectively with the contacts 37 described above. A circuit making rotor 40 is rotatably mounted between the legs of the spring member 38 and is provided with a projecting lug or cam 41 alternatively engageable with these legs as the rotor 40 rotates one-half revolution to complete a circuit between the adjacent contacts 37, 39, the other pair of contacts being separated by the inherent spring of the member 38. Rotor 40 is provided with shoulders 37 for the same purpose as described in connection with Fig. 1 and is driven from a shaft 14 in the same manner.

This control is particularly well suited for domestic installations wherein three-phase current is not ordinarily available and wherein use of a single-phase motor is indicated. Although particularly devised for the operation of a vertically acting door, it will be understood that my device is not necessarily limited in its specific adaptation and may be employed wherever the circumstances indicate the need of a single-phase reversing mechanism. It is, as stated, inexpensive of installation, since it eliminates the need for expensive reversing switches.

I have illustrated and described my improve-

I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a delayed action reversing control of the type described, a rotor having a conducting segment thereon, conducting members disposed in predetermined angular spacing in contact with said rotor for alternate engagement by said segment, an auxiliary motor connected to the rotor for exerting rotative effort on the latter at all times, a movable detent disposed adjacent the rotor, said rotor having stops disposed thereon in angularly spaced, predetermined relation to said segment, and engageable with said detent to normally prevent rotation of the rotor and maintain said segment in electrical engagement with one of said conducting members, an electromagnet associated with the detent to momentarily disengage the same from and permit rotation of the rotor when the electromagnet is energized, said detent engaging another stop following a predetermined delay period represented by the rotation of the rotor and engagement of the segment with another conducting member, a switch and energizing connections thereto and to the electromagnet for momentarily energizing the latter, and means for electrically energizing said segment and conducting members.

2. In a delayed action reversing control of the type described, a rotor having a conducting segment thereon, conducting members disposed in predetermined angular spacing in contact with said rotor for alternate engagement by said segment, an auxiliary motor connected to the rotor for exerting rotative effort on the latter at all times, means momentarily disengageable from the rotor and normally engageable therewith to prevent rotation of the rotor and maintain said segment in electrical engagement with one of said conducting members, electrically controllable means associated with said last named means to momentarily disengage the same from and permit rotation of the rotor, said rotation preventing means engaging the rotor following a predetermined delay period represented by the rotation of the rotor and engagement of the segment with another conducting member, a switch and energizing connections thereto and to the electrically controllable means for momentarily energizing the latter, and means for electrically energizing said segment and conducting members.

3. A delay action reversing control, said control comprising an insulating rotor having a conducting segment thereon, conducting members disposed on opposite sides of said rotor for alternate engagement by said segment following 180° rotation thereof, means including an electrically driven constant speed motor and a friction clutch mechanically connecting the last named motor to the rotor for constant speed rotating of the latter at certain times, means for continuously electrically energizing said segment, said rotor having stops disposed thereon in 180° spaced relation, a pivoted detent engageable with said stops and normally operative to prevent rotation of the rotor and maintain said segment in electrical engagement with one of said conducting members, an electromagnet associated with the detent to withdraw the same and permit rotation, said detent engaging another stop following a predetermined delay period represented by the rotation of the rotor and engagement of the segment with another conducting member to thereby alter the flow of current through the conducting members, and a manually actuable control switch button and energizing connections thereto and to the electromagnet for momentarily energizing the latter.

4. A delay action reversing control, said control comprising an insulating rotor having a conducting segment thereon, conducting members disposed in predetermined angular spacing in contact with said rotor for alternate engagement by said segment following rotation thereof, means including an electrically driven constant speed motor for constant speed rotating of the rotor at certain times, means for continuously electrically energizing said segment, said rotor having stops disposed thereon in predetermined angularly spaced relation, a pivoted detent engageable with said stops and normally operative to prevent rotation of the rotor and maintain said segment in electrical engagement with one of said conducting members, an electromagnet associated with the detent to withdraw the same and permit rotation of the rotor when the electromagnet is energized, said detent engaging another stop following a predetermined delay period represented by the rotation of the rotor and engagement of the segment with another conducting member to thereby alter the flow of current through the conducting members, and a manually actuable control switch button and energizing connections thereto and to the electromagnet for momentarily energizing the latter.

5. A delay action reversing control, said control comprising an insulating rotor having a conducting segment thereon, conducting members disposed in predetermined angular spacing in contact with said rotor for alternate engagement by said segment following rotation thereof, means for constant speed rotation of the rotor at certain times, means for continuously electrically energizing said segment, means normally operative to prevent rotation of the rotor and maintain said segment in electrical engagement with one of said conducting members, an electromagnetic means associated with said last named means to render said last named means momentarily inoperative and permit rotation of the rotor when the electromagnetic means is energized, said last named means halting the rotor following a predetermined delay period represented by the rotation thereof and engagement of the segment with another conducting member to thereby alter the flow of current through the conducting members, and a manually actuable control switch button and energizing connections thereto and to the electromagnet for momentarily energizing the latter.

6. In a delay action reversing control of the type described, a rotor having means for rotating the same at predetermined speed at predetermined intervals, means for controlling the rotation of the rotor at said intervals and for limiting the same to predetermined angular increments of 180°, comprising a pair of diametrically opposed stops on the rotor, a detent adapted to engage with said stops to prevent movement of the rotor, and an electromagnet operable on the detent for momentarily disengaging the detent from a stop engaged thereby to permit rotation of the rotor and engagement of the detent with a sucand means for re-establishing engagement of the detent with said rotor immediately following said disengagement, a continuously electrically energized conducting segment on the rotor, and a pair of conducting elements on opposite sides of the rotor, the disposition of the elements relative to the detent and stops being such that one or the other of the elements are in conducting engagement with the segment when the rotor is halted by the detent, said elements being adapted to be electrically connected respectively to the directional leads of a reversing motor, whereby the motor is normally energized in one direction or the other when the rotor is stationary, increments of rotation of said rotor representing desired delay periods intervening between the reversals of said motor.

7. In a delay action reversing control of the type described, a rotor having means for rotating the same at predetermined intervals, means for controlling the rotation of the rotor at said intervals and for limiting the same to predetermined angular increments, comprising a plurality of angularly spaced stops on the rotor, a detent adapted to engage with said stops to prevent movement of the rotor, and an electromagnet operable on the detent for momentarily disengaging the detent from a stop engaged thereby to permit rotation of the rotor and engagement of the detent with a succeeding stop, manually controllable means operable to momentarily energize said electromagnet, means for re-establishing engagement of the detent with said rotor immediately following said disengagement, a continuously electrically energized conducting segment on the rotor, and a pair of conducting elements disposed angularly of the rotor, the disposition of the elements relative to the detent and stops being such that one or the other of the elements are in conducting engagement with the segment when the rotor is halted by the detent, said elements being adapted to be electrically connected respectively to the directional leads of a reversing motor, whereby the motor is normally energized in one direction or the other when the rotor is stationary, increments of rotation of said rotor representing desired delay periods intervening between the reversals of said motor.

8. In a delay action reversing control of the type described, a rotor having means for rotating the same at predetermined intervals, means for controlling the rotation of the rotor at said intervals and for limiting the same to predetermined angular increments, comprising a plurality of angularly spaced stops on the rotor, a detent adapted to engage with said stops to prevent movement of the rotor, momentary disengagement of the detent from a stop being effective to permit rotation of the rotor and engagement of the detent with a succeeding stop, means operable to momentarily disengage the detent from a stop, and means for re-establishing engagement of the detent with said rotor immediately following said disengagement, a pair of conducting elements disposed angularly of the rotor, and means alternately coacting therewith to complete electrical circuits therethrough, the disposition of the elements relative to the detent and stops being such that one or the other of the elements is in conducting engagement with said last named means when the rotor is halted by the detent, said elements being adapted to be electrically connected respectively to the directional leads of a reversing motor, whereby the motor is normally energized in one direction or the other when the rotor is stationary, increments of rotation of said rotor representing desired delay periods intervening between the reversals of said motor.

9. In a delay action reversing control of the type described, a rotor having means for rotating the same at predetermined intervals, means for controlling the rotation of the rotor at said intervals and for limiting the same to predetermined angular increments, comprising a plurality of angularly spaced stops on the rotor, and a detent adapted to engage with said stops to prevent movement of the rotor, momentary disengagement of the detent from a stop being effective to permit rotation of the rotor and engagement of the detent with a succeeding stop, manually controllable means operable to momentarily disengage the detent from a shoulder, means for re-establishing engagement of the detent with said rotor immediately following said disengagement, an electrically energized conducting segment on the rotor, and a pair of conducting elements disposed angularly of the rotor, the disposition of the elements relative to the detent and stops being such that one or the other of the elements are in conducting engagement with the segment when the rotor is halted by the detent, said elements being adapted to be electrically connected respectively to the directional leads of a reversing motor, whereby the motor is normally energized in one direction or the other when the rotor is stationary, increments of rotation of said rotor representing desired delay periods intervening between the reversals of said motor.

10. A delay action reversing control for a reversible, three-lead, single-phase motor, comprising, a circuit controlling rotor, conducting members disposed in predetermined angular spacing relative to said rotor, means timed by the rotation of the rotor for alternate engagement with and disengagement from said conducting members to make and break a circuit through the latter, means including an electrically driven constant speed motor for the constant speed rotating of the rotor at certain times, means for continuously electrically energizing said timed means, said rotor having stops disposed thereon in predetermined angularly spaced relation, a detent engageable with said stops and normally operative to prevent rotation of the rotor and maintain said timed means in electrical engagement with one of said conducting members, an electromagnet associated with the detent to withdraw the same and permit rotation of the rotor when the electromagnet is energized, said detent engaging another stop following a predetermined delay period represented by the rotation of the rotor and engagement of the timed means with another conducting member to thereby alter the flow of current in the conducting members, and a manually actuable control switch button and energizing connections thereto and to the electromagnet for momentarily energizing the latter.

11. A delay action reversing control for a reversible, three-lead, single-phase motor, comprising, a circuit controlling rotor having a cam thereon, conducting members disposed in predetermined angular spacing relative to said rotor, contact members controlled by said cam upon rotation of the rotor for alternate engagement therethrough, means for the constant speed rotation of the rotor at certain times, means for continuously electrically energizing said contact and conducting members, means normally operative to prevent rotation of the rotor and maintain one of said contact members in electrical engagement with one of said conducting members, an electromagnetic means associated with said last named means to render said last named means momentarily inoperative and permit rotation of the rotor when the electromagnetic means is energized, said last named means halting the rotor following a predetermined delay period represented by the rotation thereof and engagement of the other contact member with another conducting member to thereby alter the flow of current in the conducting members, and a control switch element and energizing connections thereto and to the electromagnet for momentarily energizing the latter.

12. A reversing control comprising a rotor, a continually electrically energized stalling motor drivingly connected to said rotor to actuate the same at predetermined intervals, a detent member normally engageable with said rotor, said rotor and detent member having means coacting to halt the rotor in opposition to the torque of said motor when the member is in operative position relative thereto at least twice during each complete revolution of the rotor, electromagnetic means coacting with said detent member when energized to withdraw the member from operative engagement with the rotor and enable said stalling motor to actuate the rotor, an electric circuit for energizing said electromagnetic means including a switch instantaneously actuable to complete said energizing circuit through said electromagnetic means, and a plurality of electrically energizable reversing contacts successively actuated by said rotor following a predetermined delay period represented by the step rotation of the rotor and while it is held against rotation by said detent member.

13. A reversing control comprising a rotor, a continually electrically energized motor yieldably driving said rotor to actuate the same at predetermined intervals, a detent member normally engageable with said rotor, said rotor and detent member having means coacting to halt the rotor in opposition to the torque of said motor when the member is in operative position relative thereto at least twice during each complete revolution of the rotor, electromagnetic means coacting with said detent member when energized to withdraw the member from operative engagement with the rotor and enable said motor to actuate the rotor, an electric circuit for energizing said electromagnetic means including electromagnetic means, and a plurality of electrically energizable reversing contacts successively actuated by said rotor following a predetermined delay period represented by the step rotation of the rotor and while it is held against rotation by said detent member.

14. A reversing control comprising a rotor, a stalling motor drivingly connected to said rotor to actuate the same at predetermined intervals, a detent member normally engageable with said rotor, said rotor and detent member having means coacting to halt the rotor in opposition to the torque of said motor when the member is in operative position relative thereto, electromagnetic means coacting with said detent member when energized to withdraw the member from operative engagement with said rotor and enable said stalling motor to actuate the rotor, an electric circuit for energizing said electromagnetic means including a switch to complete said energizing circuit through said electromagnetic means, a circuit control member on said rotor, and electrically energizable reversing contacts alternately engaged by said control member to determine the direction of current flow therethrough, said detent member coacting with said rotor to stop the same in its successive circuit closing positions following a predetermined delay period represented by the step rotation of the rotor and to hold the same in such position until the detent is released by said electromagnetic means.

15. A reversing control comprising a rotor, a motor yieldably driving said rotor to actuate the same at predetermined intervals, a detent member normally engageable with said rotor, said rotor and detent member having means coacting to halt the rotor in opposition to the torque of said motor when the member is in operative position relative thereto, electromagnetic means coacting with said detent member when energized to withdraw the member from operative engagement with said rotor and enable said motor to actuate the rotor, an electric circuit for energizing said electromagnetic means including a switch to complete said energizing circuit through said electromagnetic means, a circuit control member on said rotor, and electrically energizable reversing contacts alternately engaged by said control member to determine the direction of current flow therethrough, said detent member coacting with said rotor to stop the same in its successive circuit closing positions following a predetermined delay period represented by the step rotation of the rotor and to hold the same in such position until the detent is released by said electromagnetic means.

HERBERT CADY BLODGETT.